United States Patent [19]

Garcia et al.

[11] Patent Number: 5,355,804
[45] Date of Patent: Oct. 18, 1994

[54] RAIL-GUIDED APPARATUS-CARRYING SYSTEM

[76] Inventors: Eduardo R. Garcia; Patricia Lazzeretti, both of 4100 Lugones St., 1430 Buenos Aires, Argentina

[21] Appl. No.: 145,123

[22] Filed: Nov. 3, 1993

Related U.S. Application Data

[63] Continuation-in-part of Ser. No. 806,760, Dec. 13, 1991, abandoned.

[51] Int. Cl.$^5$ .............................................. B61B 3/02
[52] U.S. Cl. ...................................... 104/93; 104/94; 104/296; 105/150; 105/155; 105/156; 191/23 A; 191/45 A
[58] Field of Search ............... 104/89, 93, 94, 108, 104/109, 296; 105/29.1, 150, 155, 156; 191/23 R, 23 A, 45 A, 32, 44.1

[56] References Cited

U.S. PATENT DOCUMENTS

| | | | |
|---|---|---|---|
| 818,608 | 4/1906 | Brower | 105/150 X |
| 2,443,371 | 6/1948 | Barner | 191/23 A |
| 3,495,720 | 2/1970 | Mann, Jr. et al. | 105/156 X |
| 3,801,751 | 4/1974 | Ross, Jr. et al. | 191/44.1 |
| 4,172,423 | 10/1979 | Monne | 105/155 X |
| 4,944,230 | 7/1990 | Maeda et al. | 104/94 |
| 5,020,440 | 6/1991 | Ohara et al. | 104/296 X |

FOREIGN PATENT DOCUMENTS 1131110 2/1957 France .......................... 191/23 A Primary Examiner—Robert J. Oberleitner
Assistant Examiner—S. Joseph Morano
Attorney, Agent, or Firm—Keck, Mahin & Cate

[57] ABSTRACT

A rail-guided apparatus-carrying system for conveying and moving an apparatus such as a loudspeaker or a spotlight along a predetermined path defined by the system when fixed in a wall or roof of a housing, the system comprising a rail-like stationary holder to be fixed to the roof and a movable carrier including a driving motor unit for moving the carrier along the holder and an apparatus actuating unit for moving the apparatus relative to the carrier, the apparatus being connected to the carrier by an apparatus hanging member, the carrier being supported in the holder by a supporting-guiding-stabilizing mechanism including damping-resilient devices for obtaining steady and smooth movements for the carried apparatus, an electrical system being provided to supply electricity to the units.

19 Claims, 10 Drawing Sheets

FIG_13
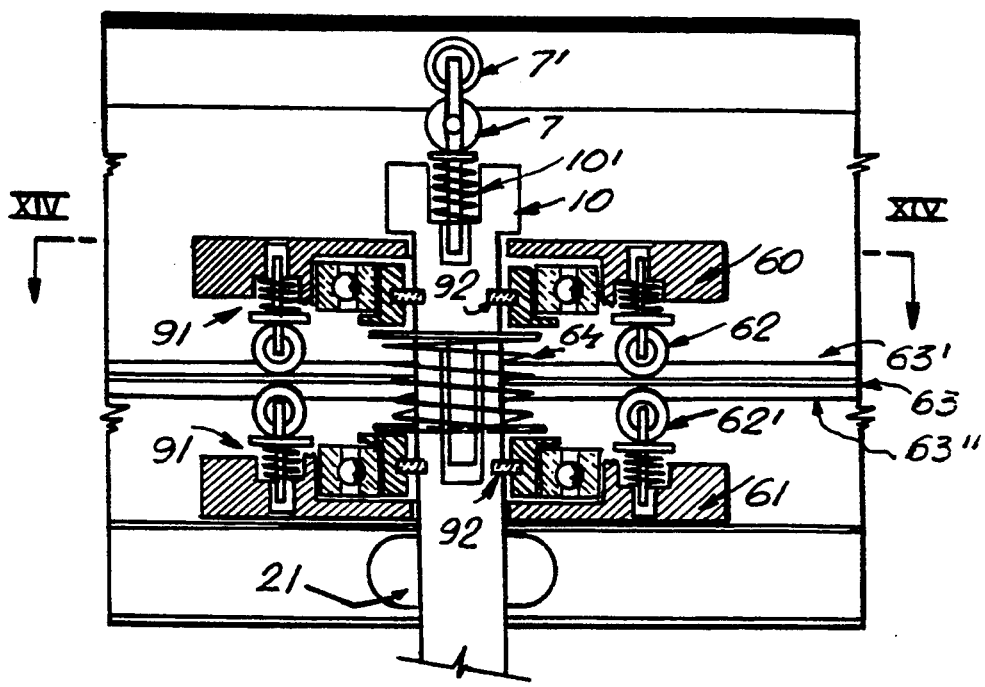
FIG_14
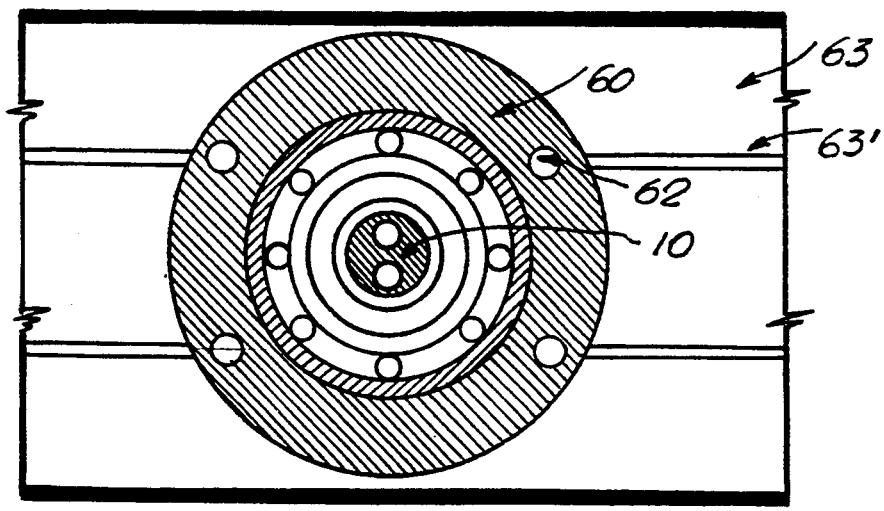

RAIL-GUIDED APPARATUS-CARRYING SYSTEM

This application is a continuation-in part of application Ser. No. 07/806,760, filed Dec. 13, 1991, now abandoned.

BACKGROUND OF THE INVENTION

The present invention relates to a rail-guided apparatus carrying system particularly for moving with steady and smooth movements, at least one apparatus which is applied to a roof, to a wall of a housing, or to any other structure of a building, wherein the apparatus may be moved along a predetermined path. The term "apparatus or apparatuses" refers to the general concept of any kind of articles, objects, apparatuses, devices, appliances, like loudspeakers, spotlights, tools, etc., but particularly refers to light articles like a lighting apparatus which may be rotated and or moved along a wall or a roof, in housings, structures, offices, supermarkets, etc.

The preferred embodiments of the invention will be described with reference to a system that may be applied to a roof of a house. The invention can be applied to any kind of wall, floor or roof surface and it may be used embedded in a wall, in inclined walls, beams, profiles, etc. The system is also useful for showing objects in expositions, lectures, conferences, etc. The system proposed is connected to a house surface. The house surface defines a support surface and in the case of a floor or an inclined roof or wall, adapting means may be added to support the rail in which the system runs. The rail is connected to the house surface by means of adjustable brackets.

For some considerable time, attempts have been made to provide simple, easy-installation, agreeable systems for installing for example, spotlights or loudspeakers in houses with the possibility of moving them along a predetermined path within a room, like a livingroom, a bath-room, etc.

Most of the existing systems consist of a mere rail for supporting the spotlight in a stationary manner, while it is necessary to move the spotlight by hand in order to locate it in a desired position.

It is generally necessary the use of ladders for this operation, what is cumbersome and dangerous.

Even when these spotlights may be moved by hand, generally the power supplying wires that receive the electricity from the power line has a length insufficient to move the spotlight to extreme positions or, otherwise, when the spotlight is moved to a position closed to the place the wires enter the roof, or the electrical wall boxes, the wire in excess hangs out from the roof.

Particularly for lighting apparatuses, like spotlights, it is very important that the movement thereof be smooth and uniform to avoid disturbing illumination of the room.

Other wire-less devices, however, may be moved and kept stationary in predetermined locations of the rail while electrical connectors are provided for supplying electricity to the device.

SUMMARY OF THE INVENTION

It has now surprisingly been found that the problems and drawbacks of the techniques and devices described above can be eliminated by the present invention.

The invention is directed to a rail-guided apparatus-carrying system for conveying and moving, with steady and smooth movements, at least one lighting apparatus along a predetermined path defined in a support surface, the system comprising a rail-like holding assembly having a profile shape with a base to be connected to the support surface, the holding assembly having faces defining at least three guiding, supporting, stabilizing and driving tracks; a movable carrier connected to a supporting-guiding-stabilizing mechanism capable of running along the holding assembly, the supporting-guiding-stabilizing mechanism having at least guiding, supporting and stabilizing wheels for running over at least the guiding, the supporting and the stabilizing tracks, the carrier including a driving motor unit for moving the carrier along the holding assembly; first damping-resilient means connected at least to the supporting, guiding and stabilizing wheels for causing said wheels to be resiliently urged, with damping effect, at least against the supporting, guiding and stabilizing tracks, the damping-resilient means exerting opposite forces on the wheels for compensating any alterations appearing on the conveying and movement of the carried apparatus; an electrical-feeding system to supply electrical power to at least the movable carrier and to the carried apparatus, the electrical-feeding system including a plurality of electrical contacts provided in at least one face of the holding assembly, the electrical contacts being capable of being fed by a power line through electrical connectors; driving means connected to the driving motor unit and to the driving track; the driving means comprising at least one shaft driven by the driving motor unit, the shaft having at least one driving wheel for running over the driving track; and power collecting means provided in the movable carrier, electrically connected to at least the driving motor unit, capable of collecting power from the electrical contacts of the holding assembly by means of at least one electrical connecting finger in contact with the electrical contacts of the holding assembly.

The system of the invention is specially developed to convey and move illuminating devices, such as splotlights, which are light in weight, and which must be smoothly, uniformly and steadily conveyed and moved to avoid unpleased light effects in the illuminated room and objects.

The system of the invention is capable of being operated by remote control such as by ultrasonic, infrared or radio control. The system may also be operated through a switch, for example embedded into the wall.

Other features and advantages of the invention will become apparent from the following description of preferred embodiments of the invention with reference to the accompanying drawings.

BRIEF DESCRIPTION OF THE DRAWINGS

FIG. 13 is a side elevational view of another embodiment of the present invention.

FIG. 14 is a cross-sectional view taken along line XIV—XIV in FIG. 13.

DESCRIPTION OF THE PREFERRED EMBODIMENT

Figure 1:
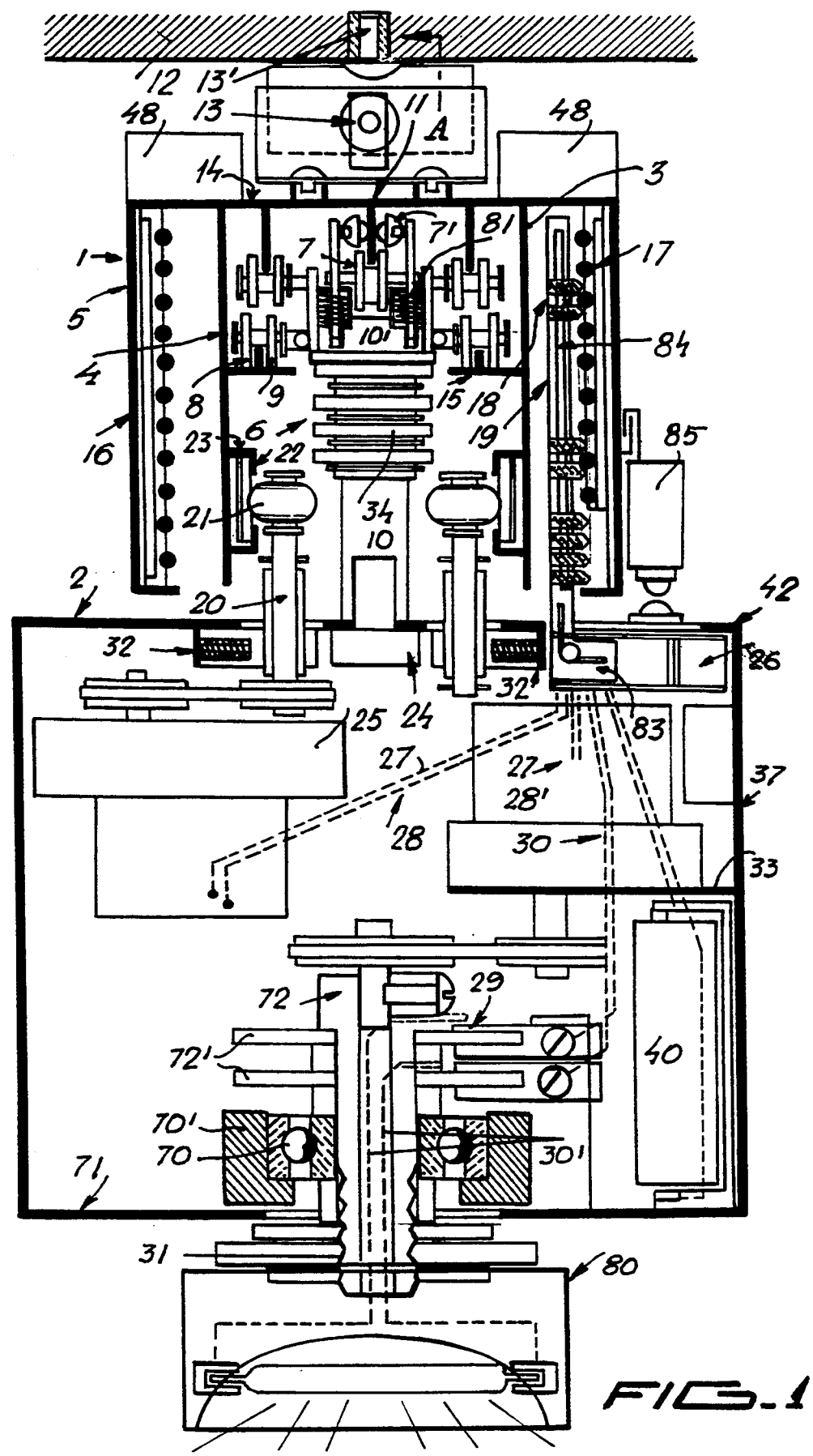
FIG. 1 is a cross-sectional view, taken along line I—I in FIG. 4, of the system according to the present invention.

Referring to FIG. 1, an apparatus-carrying system according to a first embodiment of the present invention is shown. A holding assembly 1 and a movable carrier 2, capable of carrying an apparatus 80 are illustrated.

Holding assembly 1 includes a U-shaped profile holder 3 having a base 14 that may be affixed to a roof 12 by means of adjustable brackets 13 or any other securing members fixed by screws 13' to roof 12. In this case the roof 12 defines the support surface of the system. U-shaped profile comprises all profiles having a base and at least one pair of facing wings with the wings extending transversely to the base either in a normal or an inclined configuration. Base 14 has a vertical pending guiding rib 11 for the purposes described below, projecting from an inner face of the base 14. Although one rib is illustrated more than one rib may be provided, also upright extended. A pair of parallel inner wings 4 transversely extending from base 14 provide, in an inner face thereof, opposite flanges 15 defining respective supporting tracks lying in the same plane. At a lower end of wings 4, a track retaining profile 22 is provided for defining respective opposite driving tracks 23 in order that the movable carrier 2 may move along the entire length of holder 3 as it will be described below. In the case holder 3 is to be affixed to a vertical wall, it may be supported in the wall through base 14 with minor changes done in the system.

Parallel to inner wings 4 there is provided at least one but preferably a pair of parallel outer wings 5 also pending, in this embodiment, from base 14 of holder 3. An electrical-feeding system 16 comprises outer wings 5 carrying electrical contacts 17 which may be connected to the power line of the house wherein the system of the present invention is installed. The purpose of the electrical-feeding system 16 is to supply power to the movable carrier 2 and to the apparatus 80 that is carried by the movable carrier 2. Contacts 17 may consist of elongated conductors such as bars, tracks, rails and the like.

In order that the movable carrier 2 may move along the length of holder 3, with steady and smooth movements, a supporting-guiding-stabilizing mechanism 6 is provided to connect, in a movable relationship, holder 3 with carrier 2. For this purpose mechanism 6 is provided with a central hanger bar 10 which, at a lower end thereof, is connected to, for example, an upper wall 42 of a carrier box 37 of the carrier 2, by means of a connecting member 24. Mechanism 6 runs along the holding assembly and may run entirely or partirely within the holding assembly 1.

All the forces appearing during movement are stabilized by mechanism 6 and the resulting forces are equilibrated through a plurality of wheels against associated tracks to which reference is made hereinunder.

Member 24 comprises any kind of retaining members, such as a threaded sleeve, which allows the upper wall 42 to be supported by the hanger bar.

At an upper end, hanger bar 10 has at least one guiding wheel 7 the purpose of which is to run over guiding rib 11 of holder 3 to guide carrier 2 along its predetermined movement path. Guiding wheels 7' may also be provided to run on the sides of rib 11, wheels 7' being ball wheels. Wheels 7, 7' can absorb transverse forces coming from the movement of carrier 2.

Figure 3:
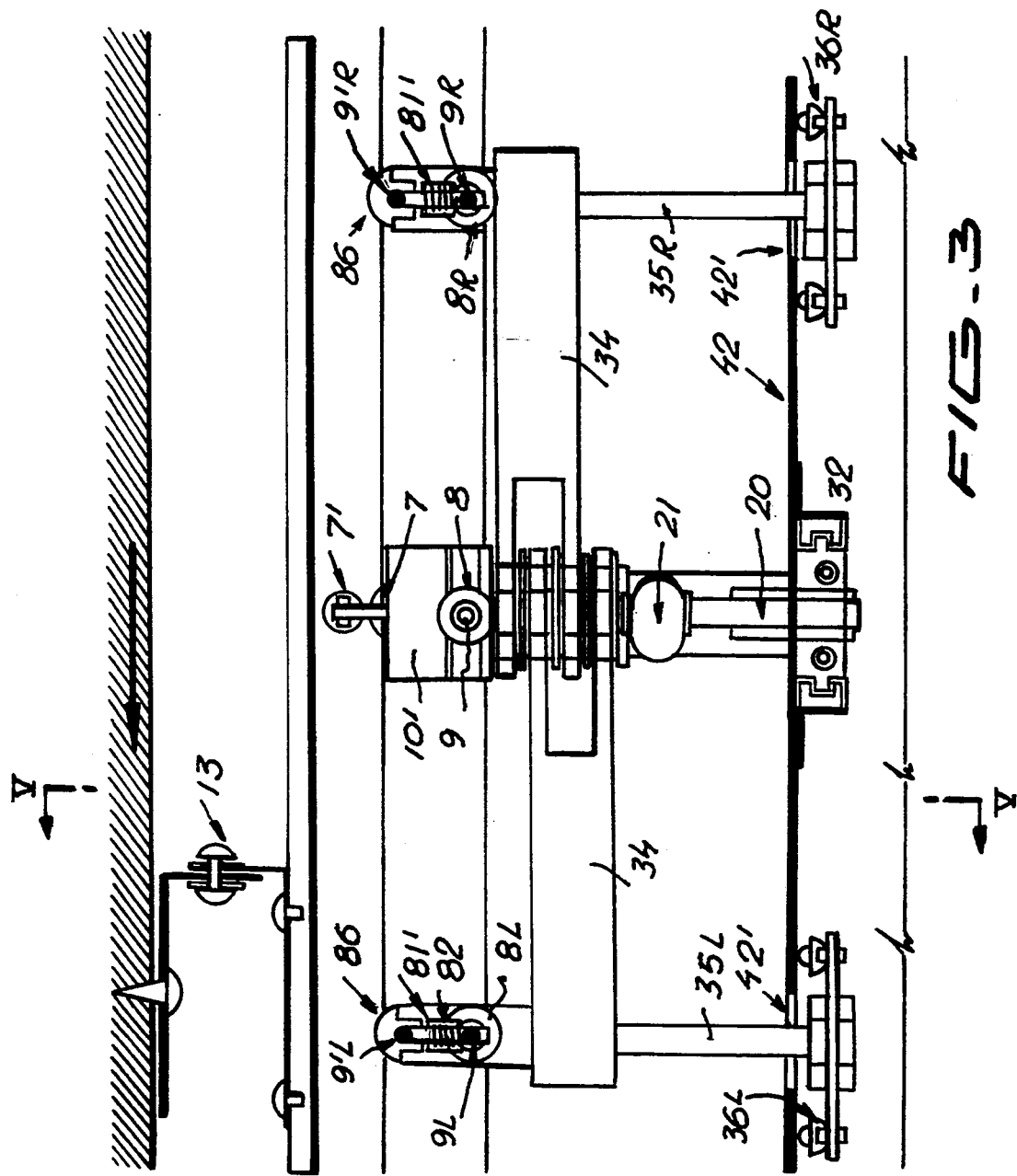
FIG. 3 is a cross-sectional view of the system taken along line III—III in FIG. 2.
Figure 4:
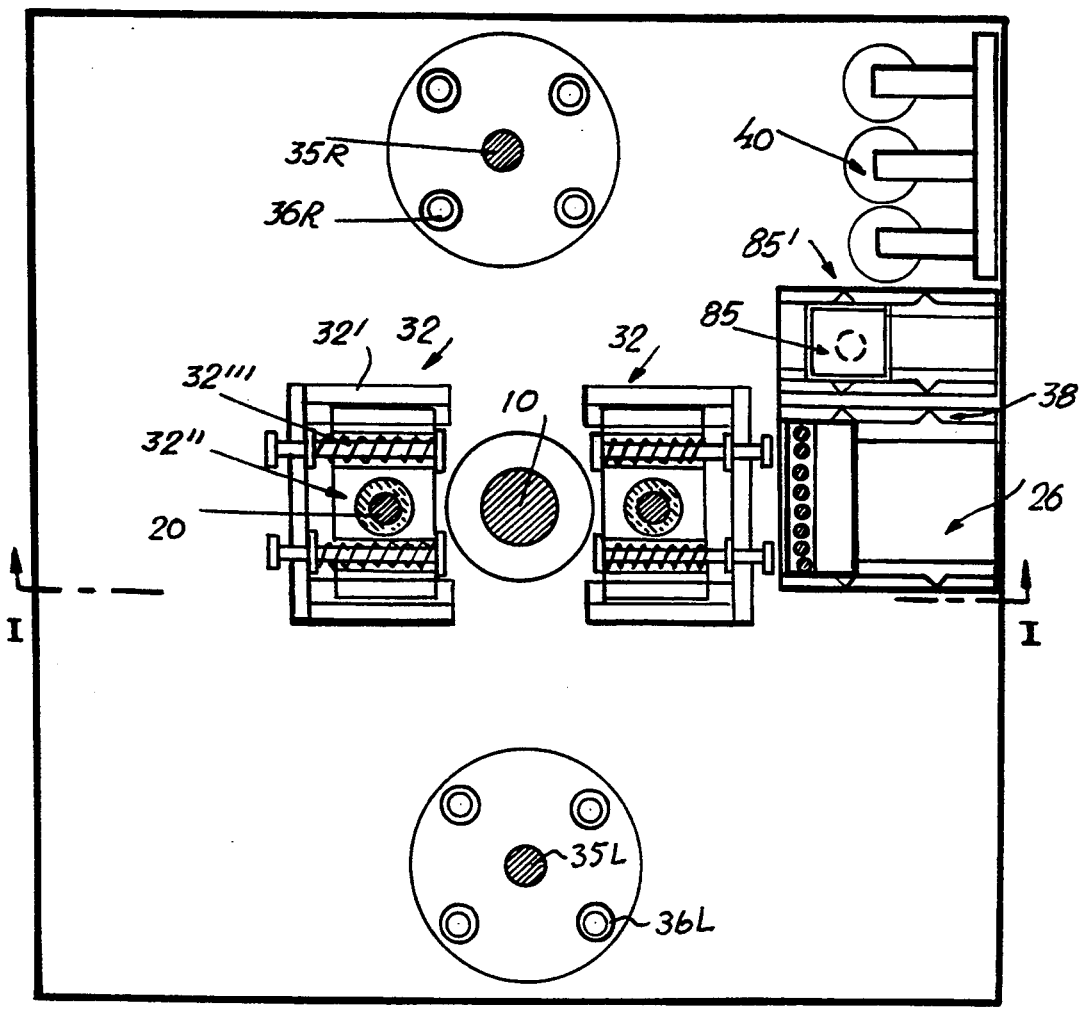
FIG. 4 is a top plan view of the system of FIG. 1, with the holding system removed and part of the carrier shown as being transparent for clarity purposes.
Figure 5:
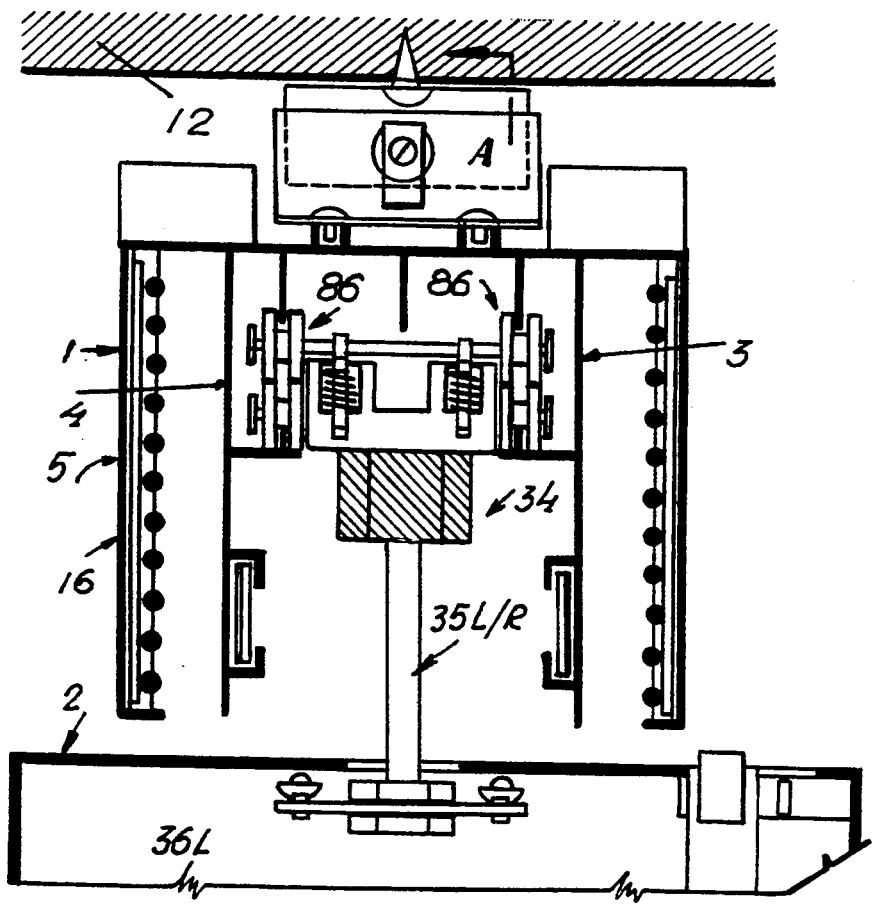
FIG. 5 is a cross-sectional view of the system, taken along line V—V in FIG. 3.

At a lower level in relation to guiding wheels 7, 7' hanger bar 10 is provided with a rotatably mounted shaft 9 having a pair of supporting wheels 8 for supporting the entire assembly formed by carrier 2 and the apparatus 80 carried by carrier 2. For this purpose, wheels 8 run over supporting tracks defined in an upper face of the opposite flanges 15 of inner wings 4 shown in FIGS. 1 and 3. The guiding effect provided by rib 11 may be other wise provided by tracks 15. In this case, each flange 15 may include an upright rib over which each supporting wheel 8 may run, in which event wheels 8 will function as supporting and guiding wheels. When the system is guided by wheels 8, wheels 7 are not necessary.

The stabilization is provided by respective leading stabilizing bars 35 L and rear stabilizing bars 35 R. Of course, these reference numbers correspond to the carrier 2 moving in the sense indicated by the arrow in FIG. 3. If the carrier is moved to the contrary sense rear bar 35 R will be the leading bar in that movement. For clarity purposes these numeral references have been adopted in respect of the selected sense of movement indicated by the arrow of FIG. 3. Stabilizing bars 35 L and 35 R respectively have, at their upper ends leading and rear lower shafts 9 L and 9 R having stabilizing wheels 8 L and 8 R also running over tracks 15. Respective leading and rear upper shafts 9'L and 9'R are provided with stabilizing and guiding wheels 86.

At least a pair of stabilizing arms 34 are pivotally connected, at an end thereof, to a middle part of hanger bar 10 while at the other end arms 34 are connected to the leading and rear stabilizing bars 35 L and 35 R. Leading and rear stabilizing bars 35 L and 35 R have, at their respective lower ends sliding ball-wheels 36 L and 36 R the purpose of which is to cooperate in the supporting and stabilization of carrier 2 by rotatably acting against the inner side of the upper wall 42 of the carrier box 37. Bars 35 L and 35 R pass through elongated openings 42' formed in the upper wall 42 for allowing the movement of the bars, while wheels 36 L and 36 R run over an inner face of wall 42.

For compensating any alteration, like vibrations, that may occur in the movement of the apparatus 80 during conveying, stopping, starting and general moving thereof, first damping-resilient means are provided. These means are connected to the guiding 7, 7', supporting 8 and stabilizing 8 L and 8 R wheels.

At the upper end of bar 10, a housing 10' is provided for locating damping-resilient means comprising springs 81 acting on supporting wheels 8 and guiding wheels 7 and 7'. These means also comprise springs 81' connected to the leading and rear stabilizing wheels 8 L and 8 R. Spring 81' provides a damping and resilient effect over wall 42 of carrier 2.

By means of the above described supporting-guiding stabilizing mechanism 6, all the loads acting on the carrier 2, as well as on the apparatus 80, even those loads that are offset of the gravity center of the entire assembly, are proportionally and uniformally unloaded over holder 3. Arms 34 also allow bars 35 L and 35 R to move along the sections of holder 3 by rotating about hanger bar 10, the bars always providing the desired stabilizing effect. Holder 3 may be formed by assembling a plurality of straight and curved portions or sections (FIG. 7) in order to define a predetermined and desired path. For moving carrier 2 along holder 3, at least one driving wheel 21 acts against the inner face of wing 4 of holder 3. Driving wheel 21 is provided at an upper end of a driving shaft 20 which in turn is powered by a driving motor unit 25 housed within a carrier box 37. In this embodiment, driving wheel 21 is a toothed wheel that runs over a toothed track 23 in order to move carrier 2 along holder 3. Although both driving wheels 21 may be powered by the motor unit 25, only one shaft 20, in this embodiment, is connected to the driving motor unit 25 while the shaft 20, located at the right side as viewed in FIG. 1 is freely-rotatably-mounted. Intermediate gears may be arranged between motor unit 25 and wheels 21 for actuating wheels 21. Driving wheels 21 may be metal, plastic or rubber made wheels. It may be necessary to keep an appropriate pressure on driving wheels 21 and against track 23 to generate the driving effect in which case second damping-resilient means comprising a pressure regulator 32 is provided for pushing driving shaft 20 in order to locate driving wheels 21 against track 23 and to exert more pressure against the latter to improve the driving conditions. Generally, the second resilient means are those separately connected to the driving and guiding-supporting-stabilizing mechanism when the same is not directly connected to the mechanism. Pressure regulator 32 comprises guiding riels 32' housing a sliding plate 32'' urged by springs 32''' in order to push shaft 20 and wheels 21 against track 23. Shaft 20 may be powered by unit 25 through a belt-assembly.

Driving motor unit may comprise a DC or AC motor or any kind of suitable appropriate motor and the pressure regulator 32 may include any kind of springs, screw-regulated springs and the like.

Movable carrier 2 also includes an apparatus actuating unit 28 comprising one or more motors 28' for generating rotations about a vertical, horizontal or an inclined axis, as well as a holding mechanism. In the case that more than one motor 28' is provided, one motor may move a support wherein another motor is mounted to obtain a wide variety of movements. The purpose of unit 28 is to provide the carried apparatus 80 with the required movement thereof. For example, if the apparatus is a spotlight, it may be necessary to provide a spotlight with a rotating movement to direct the light beam to the desired part of the room. Rotating and conveying movements can be simultaneous, as well as the spotlight can be electrically fed during movement so as to illuminate while moving.

The spotlight may be moved by unit 28 about an horizontal axis as well as about a vertical geometrical axis by means of a shaft 72. One or more motors may be provided together with electromagnetic clutches, servomechanisms, and the like.

Unit 28 may be mounted on a supporting plate 33 although it may be connected to any other part of the carrier box 37 by means of screws, or any other retaining means, as it will be discussed below.

Since unit 25 and 28 as well as the carried apparatus 80 need power to operate, power collecting means such as a plurality of multiterminals or connector boxes 26 are provided within carrier box 37. To supply electricity to units 25 and 28 as well to the apparatus 80 boxes 26 must collect power from electrical contacts 17. For this purpose, a plurality of electrical contacting fingers 19, or any other power collecting projections are provided which in turn have at their upper or distal ends a rotatably electrical-contacting head 18 the purpose of which is to move along the selected electrical contact 17 and remaining electrically engaged with contacts 17 even when carrier 2 is moving along holder 3. Head 18 may be a slidable one in which case may slide over contact 17 which may comprise a flexible plate, a metallic bar and the like. Head 18 may exert pressure against contacts 17 by means of springs or the like. Fingers 19 may be arranged in a finger support and the heads 18 may be slidably adjusted at different locations on the finger.

Figure 2:
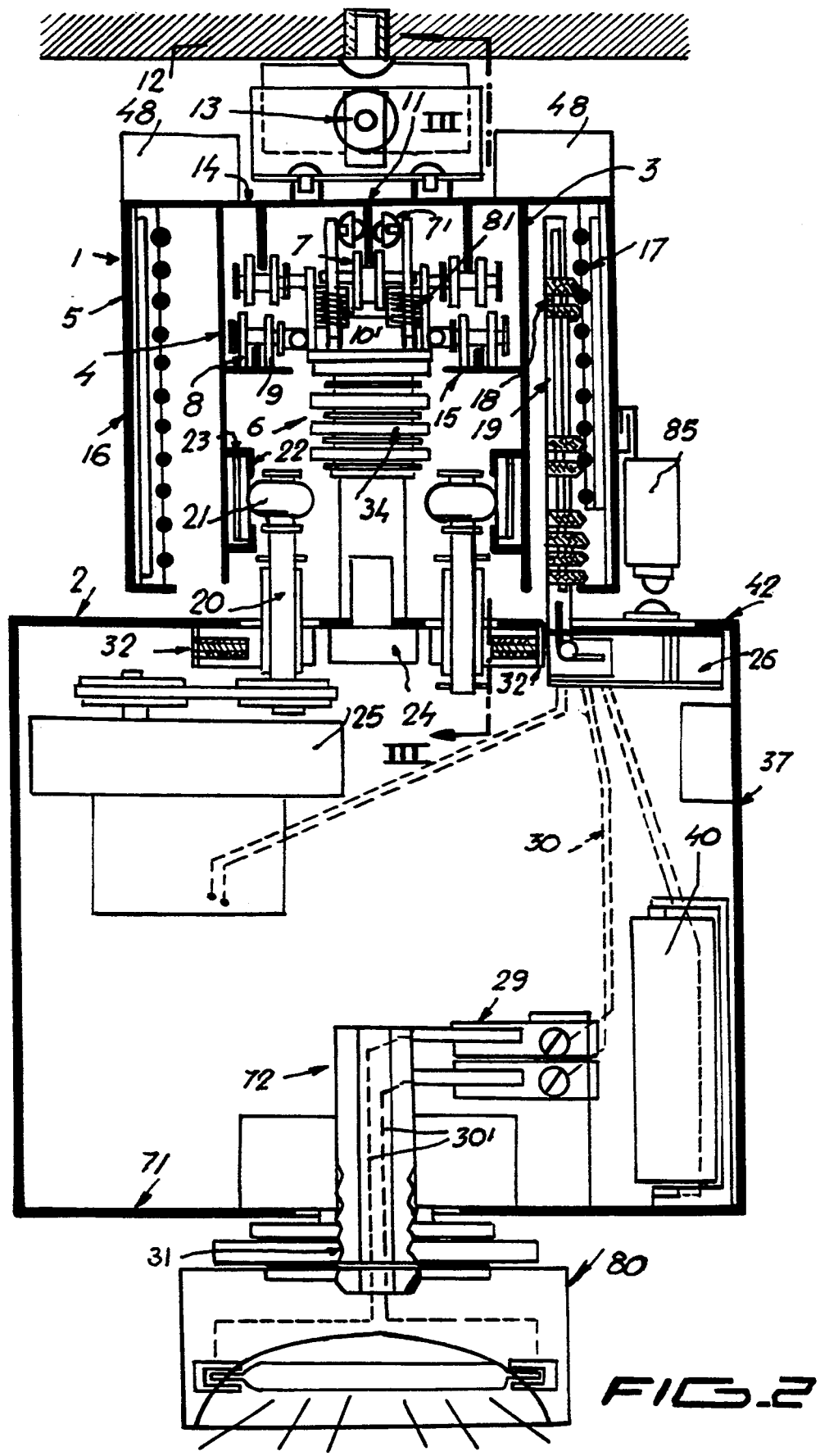
FIG. 2 is a cross-sectional view similar to FIG. 1, showing another embodiment.

Electrical conducting wires 27 or any other conductor members carry the necessary electricity to feed units 25 and 28. Electrical conducting wires 30 carry the necessary power for the rotatable electrical connectors 29 which collect the electricity and transmit it to the carried apparatus 80 which, in turn, is connected to carrier 2 by means of an apparatus hanger member 31 that comprises a retaining member such as threaded sleeves, washers and the like. Connectors 29 may comprise any rotating connectors of the conventional type which are capable of rotating while collecting electricity from wires 30 and transmitting it to the carried apparatus 80. Actuating unit 28 is also capable of retaining the apparatus while moving the apparatus and supplying power to it. In a preferred assembly the apparatus actuating unit 28 comprises a motor 28' connected to a shaft 72 rotatably mounted in the carrier by a ball bearing 70 housed in a housing 70' tightly connected to the inner face 71 of the carrier box. The shaft 72 includes power-collecting discs 72' in contact with connectors 29 which in turn are connected to wires 30. The power collected by discs 72' are conducted through wires 30' to the carried apparatus. As it is shown in FIG. 2, apparatus 80 may be connected to carrier 2 without a motor being provided, so that the apparatus 80 is fixed in one position by a stationary shaft 72 and connectors 29. Units 29 and 28 and apparatus 80 may be fed by batteries 40 which in turn are rechargeable through at least one finger 19 which is connectable to a connector-coupling means 47, 48 (FIG. 7) for recharging the batteries. The position where carrier 2 must stop to put the finger in electrical contact with means 47, 48 is detected by sensors 85 capable of sliding along cursor 85'.

Fingers 19, for feeding units 25 and 28 and for feeding batteries 40, may be connected to resilient means 83 for keeping a pressurized contact between heads 18 and contacts 17. Heads 18 may slide along a cursor 84 in the finger 19 to locate head 18 at a desired position on the finger.

In operation, the movement of carrier 2 may be started by switching on a wall embedded switch capable of making driving motor unit 25 move carrier 2 along holder 3. With a different switch, unit 28 may be operated to rotate apparatus 80, for example a spotlight, once the carrier has been moved to the desired location. Obviously, the movement of carrier 2 as well as the movement of the spotlight may be done simultaneously.

The quantity of movements to which the apparatus is subjected will depend on the needs. It is also possible to have a remote control circuit that allows the user to move the carrier and the spotlight with a remote control unit. Although the circuitry is not illustrated, this kind of remote control systems are well known in the art and we feel not necessary the description thereof.

Figure 6:
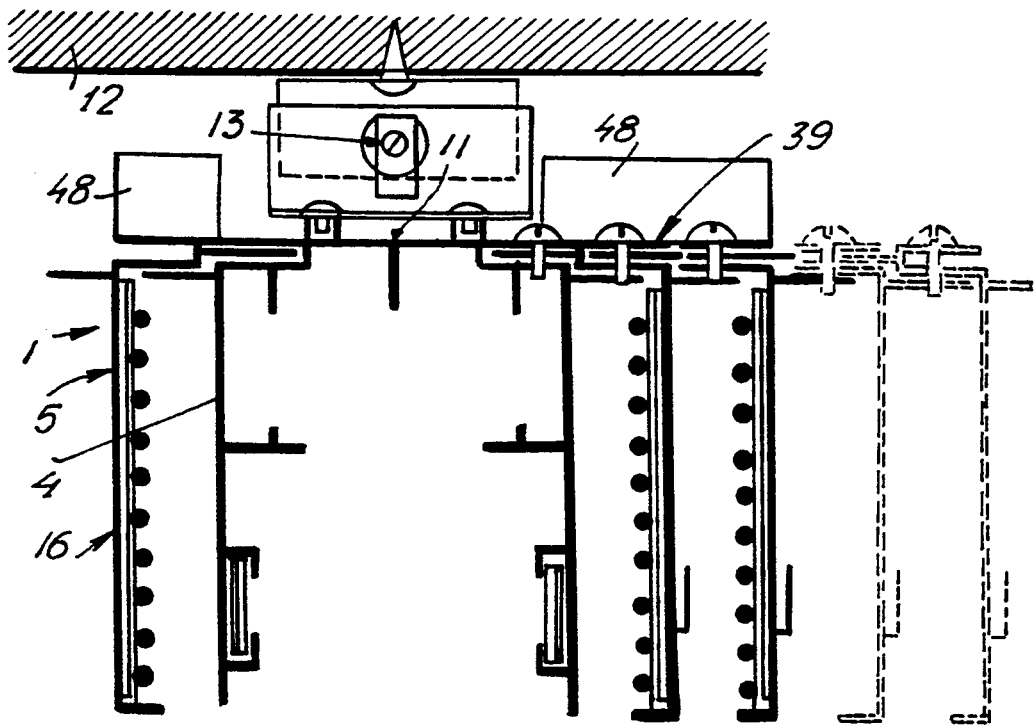
FIG. 6 is a cross-sectional view of the holding assembly showing another embodiment thereof.
Figure 7:
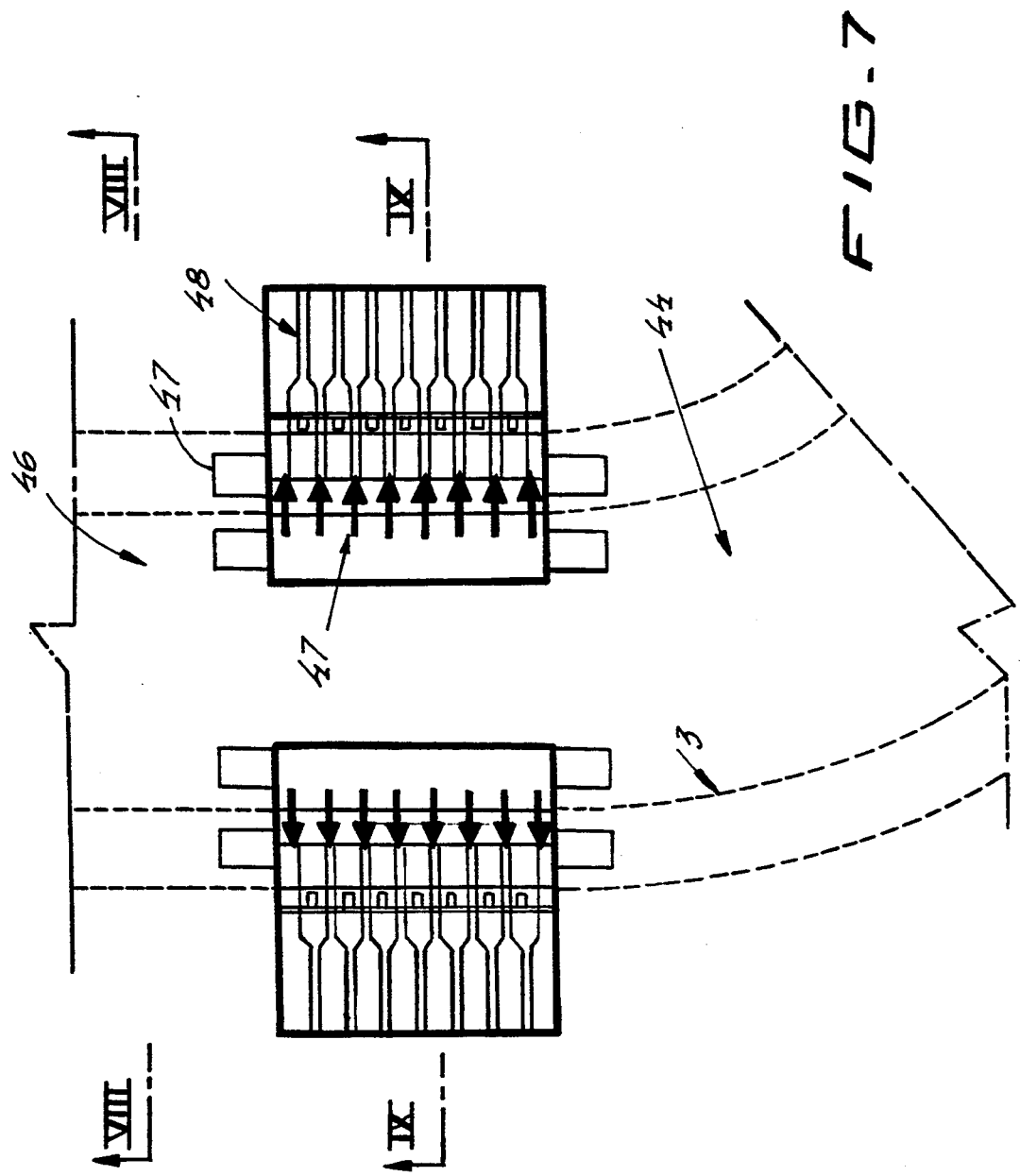
FIG. 7 is a top plan view of a connecting-coupling device for connecting two adjacent sections of the holding assembly.
Figure 8:
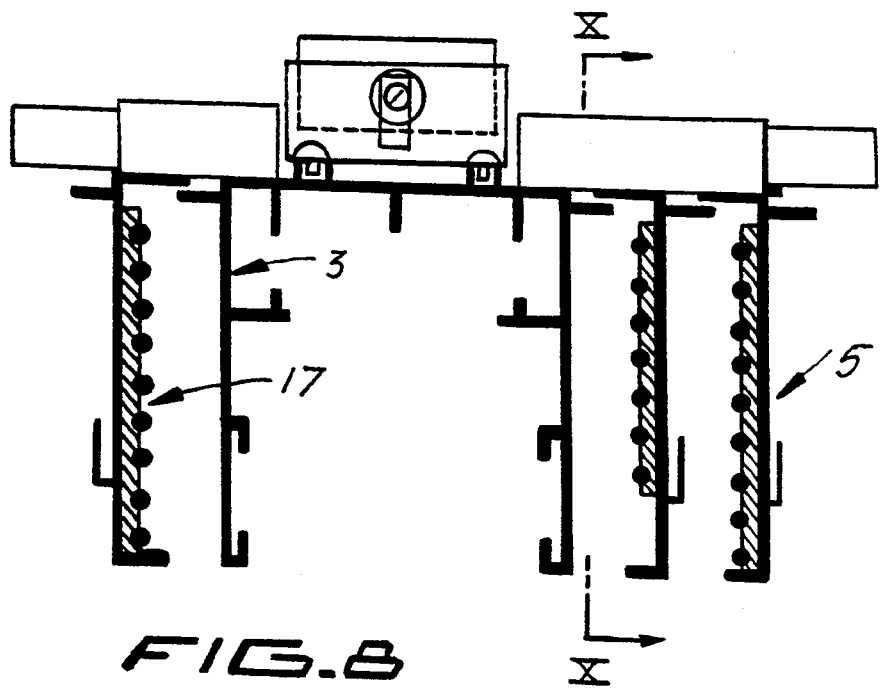
FIG. 8 is a cross-sectional view of the system, taken along line VIII—VIII of FIG. 7.

Referring now to FIGS. 6 to 8 a second embodiment of the present invention is shown. All those parts that correspond to the same already described parts in the first embodiment of FIGS. 1 to 5 will have the same reference number.

FIG. 6 shows another embodiment with a plurality of wings which are not integral with holder 3. In fact wings 5 comprise a flange profile that is slidably and/or removably connected to holder 3 by a plurality of flanges 39. Thus, it is possible to add a plurality of parallel arranged wings 5 whereby the system may have a higher number of electrical contacts 17. More than one wing 5 may be assembled to the system as it is shown in phantom lines at the right side of FIG. 6. Wings may be connected to holder 3 by any kind of retaining means such as screws, fasteners, clamps, etc. Contacts 17 may also be arranged in groups in horizontal or vertical patterns.

In order to select the different electrical contacts 17 from the different parallelly arranged wings 5 finger actuating unit 26 is provided in carrier 2. Unit 26 comprises a slide-rail or cursor 38 along which the contacting fingers 19 slide to keep an electrical engagement with the corresponding contacts 17 of any of wings 5.

FIGS. 7 to 10 show the joint between two portions or sections of holder 3, that is a curved section 44 and a straight section 46, both coupled by a connector-coupling 47. Connector-coupling means 47 provides a mechanical coupling between section 44 and 46 as well as provides the electrical coupling for the electrical contacts 17. That is, connector-coupling means 47 defines a mechanical and electrical connector-coupling. If sections 44-46 are straight some changes could be done on the carrier. For example, the guiding mechanism will not be articulated with the axis of the supporting wheels. Thus all the elements such as articulated arms provided for allowing the system to rotate in the curved portions will not be necessary. The wings 5 being of the type that may be removably assembled to holder 3. This coupling may be used in any of the above described embodiment and it is not limited to any of them.

Figure 9:
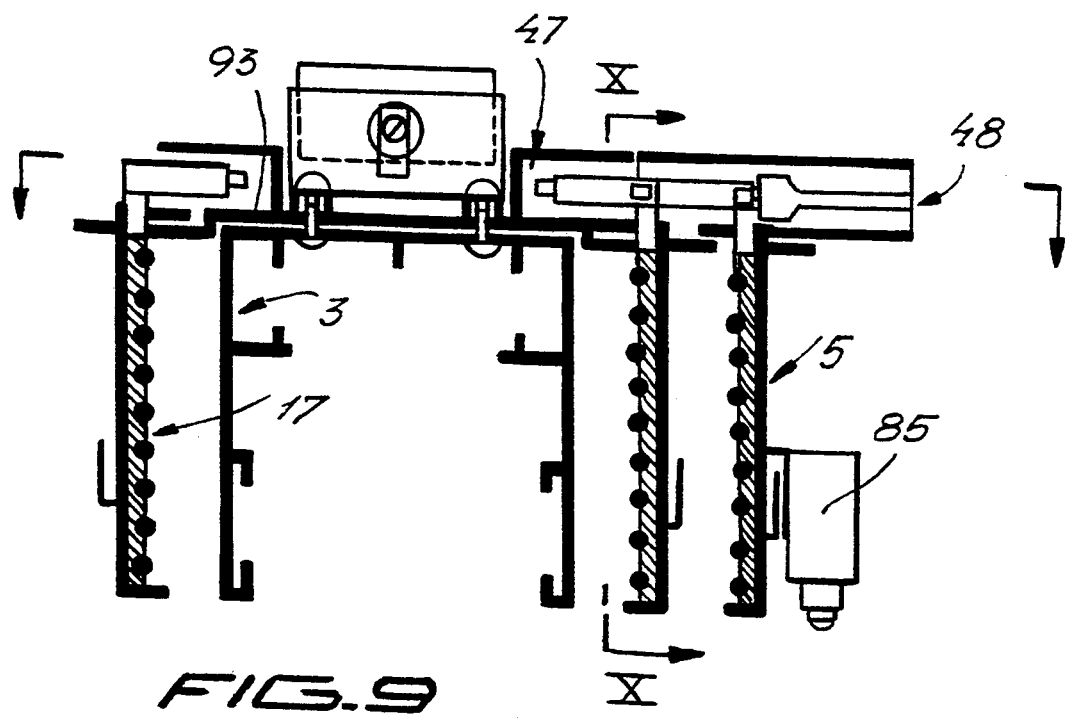
FIG. 9 is a cross-sectional view taken along line IX—IX in FIG. 7.
Figure 10:
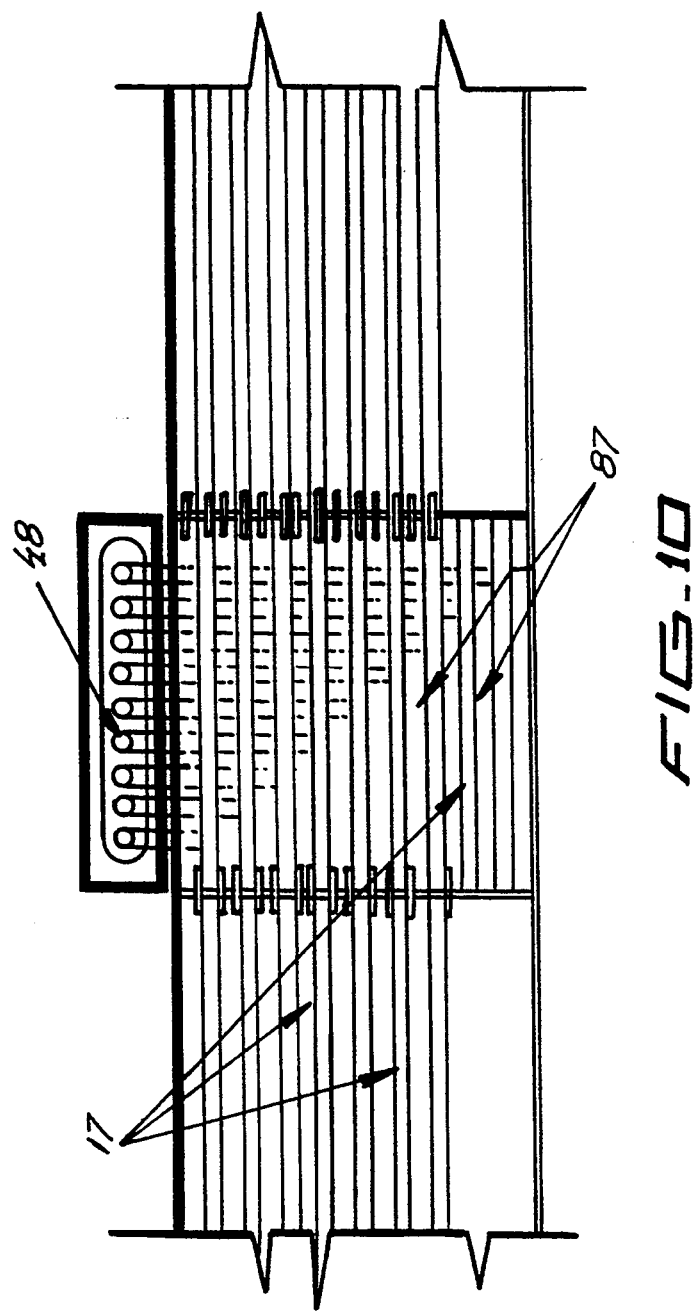
FIG. 10 is a cross-sectional view taken along line X—X in FIG. 8.

In FIG. 9 an alternative is shown wherein profile 3 is affixed removably to a base 93, so as to remove or insert mechanism 6 by previously compressing it to facilitate removing or insertion thereof within profile 3.

Although electrical contacts 17 may be connected to the power line of the housing at an end of the path defined by the system of the invention, the power may be taken at a middle part of this path, for example, through coupling 47 and by means of electrical connectors 48. This array is also useful for all the embodiments and it is thus possible to have endless electrical circuits. Electrical contacts 87 may be provided for exclusively feeding the fingers coupled to batteries 40.

For clarity purposes the stabilizing hanger mechanism 6 has not been illustrated in FIGS. 7-10 and also because it may be the same or similar to those illustrated in the already described embodiments.

Figure 11:
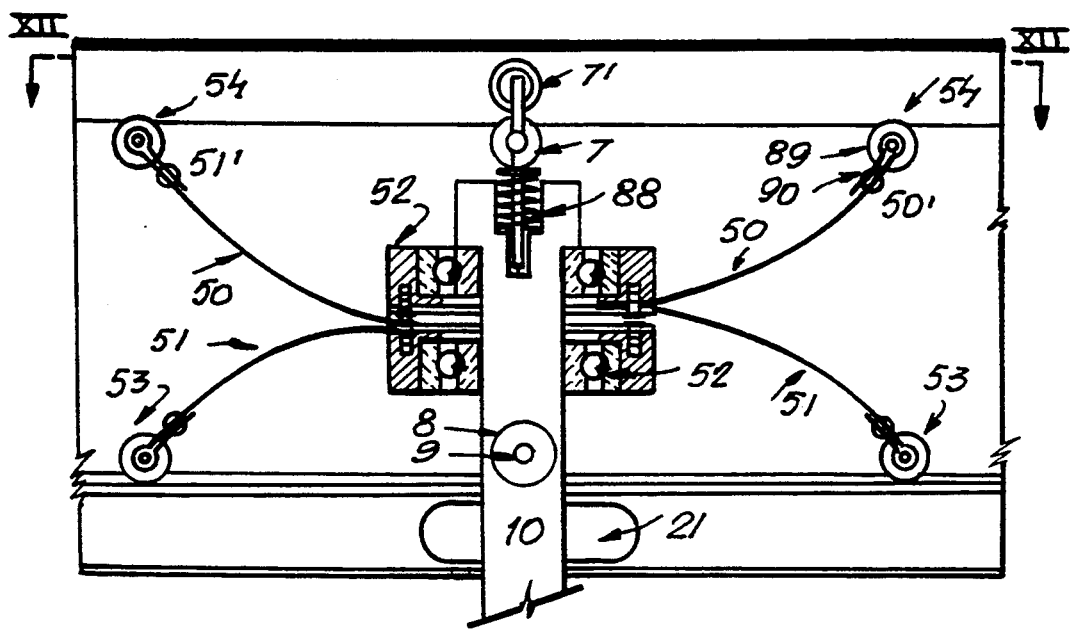
FIG. 11 is a side elevational view of another embodiment of the present invention.
Figure 12:
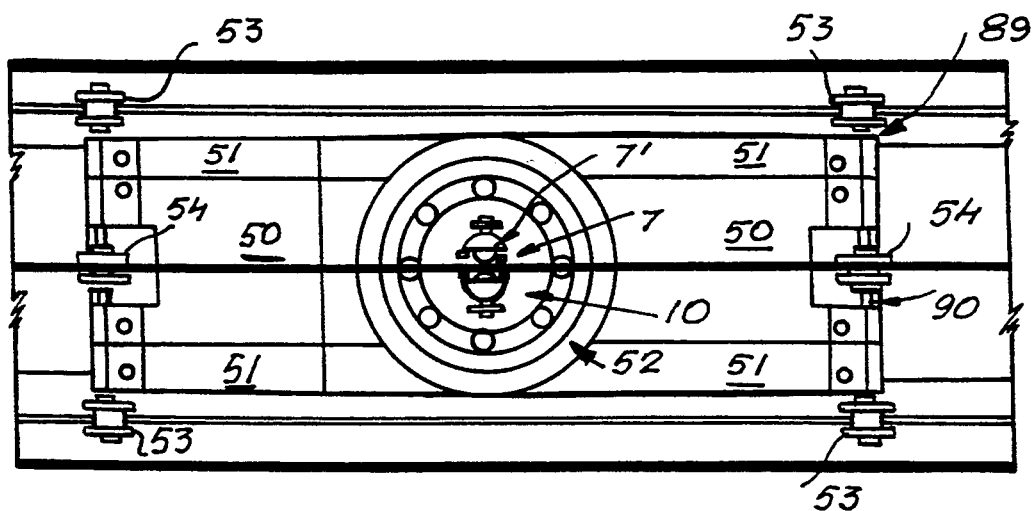
FIG. 12 is a cross-sectional view taken along line XII—XII in FIG. 11.

The embodiment of FIGS. 11 and 12 comprises a supporting-guiding-stabilizing mechanism having two pairs of flexible strips, upper pair 50 and lower pair 51, retained by ball-bearing 52 rotatably mounted on the hanger bar 10. Each pair 50 and 51 are urged away one from the other. Said ball-bearings 52 allow the mechanism to easily rotate around bar 10. The upper ends 50'-50' of said strips 50 include guiding and stabilizing wheel 54 mounted in shafts 89 by retaining means 90. Lower strips 51 also have guiding and stabilizing wheels 53. Guiding wheels 7, 7' are also provided. The first damping-resilient means comprises, in this embodiment, a damper-spring arrangement 88 plus the inherent resiliency of strips 50-51. The flexible strips will dampen the offset of non centered forces particularly appearing during movement of the carrier. Said forces may be produced by the movement about the bar 10 in relation to the carried apparatus, by the inertia of said apparatus during movement and stopping; or by the reciprocating movement of said apparatus.

It will be obvious to any person skilled in the art that the driving shaft 20 with the driving wheels 21 may be replaced by a transmission connection between driving motor unit 25 and the supporting wheels, for example the power from unit 25 to axle 9 for driving wheels 8. When axle 9 is directly powered, for example, by a belt-pulley arrangement (not shown), wheels 7' are not necessary because there is no rotating force generated by driving wheel 21 (not existent in that case). The effect should otherwise be compensated by wheels 7', as it is in the embodiments shown in all Figures.

FIGS. 13 and 14 show another embodiment wherein the supporting-guiding-stabilizing mechanism comprises supporting wheels 62 which run over supporting track 63' of flanges 63. and stabilizing wheels 62' running over stabilizing track 63" in the lower face of flange 63. This embodiment is specially appropriate to be mounted into a floor through the base of the profiled fixed to the floor.

Said wheels 62 are freely mounted on facing plates 60-61 which are connected to each other by damping-resilient means including a spring 64. The first damping resilient means comprises damper-springs 91 for any of the supporting 62 and stabilizing 62' wheels, spring 64 and resilient retainers 92 and spring 10' mounted at the upper end of hanger bar 10 and acting against wheel 7.

Although the present invention has been described with reference to preferred embodiments, workers skilled in the art will recognize that changes may be made in form and detail without departing from spirit and scope of the invention.

We claim:

1. A rail-guided apparatus-carrying system for conveying and moving, with steady and smooth movements, at least one lighting apparatus along a predetermined conveying path defined in a support surface, the system comprising:

a rail-like holding assembly having a profile shape with a base to be connected to the support surface, the holding assembly having faces defining at least three guiding, supporting, stabilizing and driving tracks;

a movable carrier connected to a supporting-guiding-stabilizing mechanism capable of running along the holding assembly, the supporting-guiding-stabilizing mechanism having at least guiding, supporting and stabilizing wheels for running over at least the guiding, the supporting and the stabilizing tracks, the carrier including a driving motor unit for moving the carrier along the holding assembly;

first damping-resilient means connected at least to the supporting, guiding and stabilizing wheels for causing said wheels to be resiliently urged, with damping effect, at least against the supporting, guiding and stabilizing tracks, the damping-resilient means exerting opposite forces on the wheels for compensating for any alterations appearing on the conveying path during movement of the carried apparatus:

an electrical-feeding system to supply electrical power to at least the movable carrier and to the carrier apparatus, the electrical-feeding system including a plurality of electrical contacts provided in at least one face of the holding assembly, the electrical contacts being capable of being fed by a power line through electrical connectors;

driving means connected to the driving motor unit and to the driving track; the driving means comprising at least one shaft driven by the driving motor unit, the shaft having, at least one driving wheel for running over the driving track; and power collecting means provided in the movable carrier, electrically connected to at least the driving motor unit, capable of collecting power from the electrical contacts of the holding assembly by means of at least one electrical connecting finger in contact with the electrical contacts of the holding assembly.

2. A rail-guided apparatus-carrying system according to claim 1, wherein second damping-resilient means are provided for resiliently urging, with damping effect, the driving wheel against the driving track.

3. A rail-guided apparatus-carrying system according to claim 1, wherein the holding assembly comprises a U-shaped profile having parallel pending inner wings and at least one outer pending wing parallel to the inner wings, the base and the inner wings having respective inner faces, the guiding track comprising a central guiding rib pending from the inner face of the base, the supporting tracks comprise upper faces of two flanges transversely projecting from the respective inner faces of the inner wings, the stabilizing tracks are disposed on the inner face of the base, at both sides of the central guiding rib, and the driving track comprises at least one track disposed on at least one of said inner wings.

4. The system of claim 3, wherein the supporting-guiding-stabilizing mechanism comprises a central hanger bar connected, at a lower end thereof, to the carrier and having, at an upper end thereof, at least one of said guiding wheels; the hanger bar also including at least one pair of said supporting wheels running over the flanges which define the supporting tracks; two stabilizing arms, each stabilizing arm being pivotally connected, at one end thereof, to the hanger bar and, at the other end thereof, to a stabilizing bar; the stabilizing bar including, at an upper end thereof, two pairs of said stabilizing wheels, one pair running over the supporting tracks and the other pair running over the stabilizing tracks.

5. A rail-guided apparatus-carrying system according to claim 4, wherein said stabilizing bar having, at a lower end thereof, at least one pair of sliding wheels acting against an upper wall of a carrier box of the movable carrier.

6. The system of claim 3 wherein the at least one outer wing is removably connected to the holder.

7. The system of claim 6, wherein said at least one outer wing comprising a plurality of parallel outer removable wings.

8. A rail-guided apparatus-carrying system according to claim 7, wherein the at least one electrical connecting finger is connected to a finger actuating unit for selecting different one of said electrical contacts from different one of said parallel wings, the unit comprises a cursor along which the at least one electrical contacting finger slides.

9. A rail-guided apparatus-carrying system according to claim 3, wherein the supporting-guiding-stabilizing mechanism comprises a central hanger bar connected, at a lower end thereof, to the carrier and having, at an upper end, at least one said guiding wheel; the hanger bar also including a pair of the supporting wheels running over the flanges which define the supporting track; two pairs of flexible strips each connected to a ball bearing rotatably mounted on the hanger bar, the strips having ends including further guiding and stabilizing wheels running at least over the rib and the supporting track, the strips form part of the first damping-resilient means and each strip of the pair is urged away one from the other.

10. A rail-guided apparatus-carrying system according to claim 3, wherein the supporting-guiding-stabilizing mechanism comprises a central hanger bar connected, at a lower end thereof, to the carrier and having, at an upper end, at least one said guiding wheel, the hanger bar also including two facing plates, one of the plates having four said supporting wheels running over the supporting tracks defined by the two flanges and the other plate having four said stabilizing wheels running over the stabilizing tracks defined on respective lower faces of the flanges, the first damping-resilient means being arranged between both facing plates.

11. A rail-guided apparatus-carrying system according to claim 1, wherein the at least one driving wheel is urged by pressure against the driving track and the pressure is controlled by a pressure regulator.

12. A rail-guided apparatus-carrying system according to claim 11, wherein the at least one driving wheel is a toothed wheel and the driving track is a toothed track.

13. A rail-guided apparatus-carrying system according to claim 1, wherein the carrier further includes an apparatus actuating unit comprising at least one motor connected to one end of a rotating shaft, the other end of the shaft being connected to the apparatus, the shaft having axially mounted power-collecting discs, the discs having their peripheries in power collecting contact with power supplying wires which in turn are connected to the electrical contacts, the shaft being rotatably mounted in the carrier through ball bearings, the discs being in power-feeding contact with the carried apparatus.

14. The rail-guided apparatus-carrying system of claim 1, further comprising batteries for supplying electrical power to at least the movable carrier and to the carried apparatus, the batteries being rechargeable and connected to the electrical-feeding system for recharging.

15. The system of claim 14, wherein the batteries are connected, in power-supplying relationship, to the driving motor unit, to the apparatus actuating unit and to the carried apparatus.

16. The system of claim 1, wherein said system is a remote control operated system.

17. The system of claim 1, wherein the holding assembly comprises curved and straight sections, coupled by a coupling member which defines a mechanical coupling between said sections as well as an electrical coupling for said electrical contacts.

18. A rail-guided apparatus-carrying system according to claim 1, wherein the holding assembly comprises a plurality of sections connected by connecting-coupling means, for mechanically connecting the sections to each other and for electrically connecting the electrical contacts of adjacent ones of said holding assembly sections.

19. A rail-guided apparatus-carrying system according to claim 18, wherein the connecting coupling means are capable of being connected to the power line, and batteries are provided for supplying electrical power to at least the movable carrier and to the carried apparatus, the batteries being rechargeable and connected to at least one further electrical connecting finger connectable to the connector-coupling means for recharging.

* * * * *